(12) United States Patent
Mikhailov et al.

(10) Patent No.: US 10,600,216 B2
(45) Date of Patent: Mar. 24, 2020

(54) AUTOMATIC DATA VISUALIZATION SYSTEM

(71) Applicants: Dmitry Mikhailov, Surrey (CA); Vadym Stetsiak, Surrey (CA)

(72) Inventors: Dmitry Mikhailov, Surrey (CA); Vadym Stetsiak, Surrey (CA)

(73) Assignee: Flowfinity Wireless, Inc., Vancouver (CA)

( * ) Notice: Subject to any disclaimer, the term of this patent is extended or adjusted under 35 U.S.C. 154(b) by 0 days.

(21) Appl. No.: 15/604,005

(22) Filed: May 24, 2017

(65) Prior Publication Data

US 2018/0300914 A1 Oct. 18, 2018

Related U.S. Application Data

(60) Provisional application No. 62/485,714, filed on Apr. 14, 2017.

(51) Int. Cl.
| | |
|---|---|
| *G06T 11/20* | (2006.01) |
| *G06T 11/60* | (2006.01) |
| *G06T 3/00* | (2006.01) |
| *G06T 3/40* | (2006.01) |
| *G06T 11/00* | (2006.01) |

(52) U.S. Cl.
CPC .......... *G06T 11/206* (2013.01); *G06T 3/0006* (2013.01); *G06T 3/4092* (2013.01); *G06T 11/60* (2013.01); *G06T 11/001* (2013.01); *G06T 2200/24* (2013.01); *G06T 2210/32* (2013.01)

(58) Field of Classification Search
CPC .................................................... G06T 11/206
See application file for complete search history.

(56) References Cited

U.S. PATENT DOCUMENTS

| | | | | |
|---|---|---|---|---|
| 2003/0120535 | A1* | 6/2003 | Duka ..................... | G06Q 40/00 705/35 |
| 2008/0086679 | A1* | 4/2008 | Gazzillo ............... | G06F 17/211 715/224 |
| 2009/0027395 | A1* | 1/2009 | Chuang ................. | G06T 11/206 345/440 |
| 2015/0187024 | A1* | 7/2015 | Karatzoglou .......... | G06Q 50/01 705/319 |

(Continued)

*Primary Examiner* — Yi Yang
(74) *Attorney, Agent, or Firm* — Mehrman Law Office; Michael J. Mehrman

(57) ABSTRACT

A data visualization system that automatically optimizes tick mark alignment to improve readability and conceptual accessibility of multiple graphs presented in a common display area. The data visualization system optimizes the tick mark alignment by normalizing the orders of magnitudes of the data sets and minimizing an objective function that balances tick resolution versus unused chart space on the common axis. The data visualization system may optionally color code the graphs and data ranges represented on the common axis to improve readability. Automatic scaling and tick mark alignment of the data sets is based on the display dimensions, which allows the graphs to be quickly re-optimized and redrawn on the fly. For example, the graphs may be automatically re-optimized and redrawn in response to display screen rotation, display area resizing, and display on different devices in a manner that appears to be effectively instantaneous to the typical user.

8 Claims, 3 Drawing Sheets

(56) References Cited

U.S. PATENT DOCUMENTS

2015/0242997 A1* 8/2015 Sun .......................... G06T 3/60
  345/649
2015/0249774 A1* 9/2015 Bienvenu ............... H04N 5/211
  348/614

* cited by examiner

AUTOMATIC DATA VISUALIZATION SYSTEM

REFERENCE TO RELATED APPLICATION

This application claims priority to U.S. Provisional Patent Application Ser. No. 62/485,714 entitled "Method of Multi-axis Graphical Data Visualization" filed Apr. 14, 2017, which is incorporated by reference.

TECHNICAL FIELD

The present invention relates to data visualization systems and, more particularly, to a data visualization system that automatically normalizes and graphs multiple data sets against a common axis to optimize tick mark alignment to improve readability and conceptual accessibility of multiple graphs presented in a common display area.

BACKGROUND

In the current state of the art, charts with multiple data sets graphed against a common axis (sometimes referred to as "multi-axis charts") are typically limited to dual data sets per axis (e.g., representing two data sets on the vertical axis, commonly referred to as the "Y-axis"). Graphing two data sets against a common axis, such as the Y-axis, allows two graphs with different units to be displayed together in the same display area. Multi-axis charts of this type are rarely utilized, and when they are utilized the technology leaves configuration of many parameters used to display the chart up to the user on a case-by-case basis. For example, the value ranges represented on the common axis, the tick marks shown for each data, and the precision or step size shown for each data set are typically left to the chart designer to configure, often through cumbersome interfaces. Configuring the chart may involve long sets of dialogs requiring the designer to select a large number of different configuration options, view the resulting chart, and make adjustments until the display is acceptable.

Aligning the tick mark values for multiple data sets graphed against a common axis can be very challenging. Even if the chart designer manages to accomplish tick mark alignment for a particular chart size, the result is often less than optimal and limited to one particular display size, one particular set of data ranges, and one particular set of step sizes. Unfortunately, the painstakingly configured tick mark alignment of a carefully defined chart is often lost when a user changes the aspect ratio of the chart, accesses the chart with a different display device, or even when the user merely rotates or resizes the screen. Should the screen size or orientation, or the range values or step sizes change for any reason, the user must typically start over to realign the tick marks.

Conventional data charting systems offer little automation to optimize the presentation of multi-axis charts. In the dual axes case, automation may be employed to minimize the empty unused space, for example by adjusting the data ranges for each data set so that each graph fills the range space available along the common axis. Automatically adjusting the data ranges to eliminate unused space is typically accompanied by sacrificing the tick alignment between the data sets represented on the common axis. Showing non-aligned tick marks that are each represented by a horizontal line across the display area clutters the presentation.

Alternatively, the tick marks for one or more data sets may be recomputed so that they coincide to create common tick marks for multiple data sets graphed against a common axis, but this usually results in "off-round" tick marks with many place values rather than the more familiar "round" tick marks with fewer place values (e.g., the tick marks are presented with odd looking numbers with many place values, such as 176.567, instead of more easily understandable "round" figures with fewer place values, such as 175 or 180). In other words, adjusting the tick marks to numbers with many place values, as opposed to integer or "round" fractions with a small number of place values, impairs the tick value intuitiveness and reduces the readability and conceptual accessibility of the chart. This makes it more difficult for a reader to apprehend the relationships between the graphs at a glance, which is usually the purpose of representing multiple data sets with different units on a common axis in the first place. There is, therefore, a continuing need for a data visualization system with improved ability to graph multiple data sets against a common axis.

SUMMARY

The present invention may be embodied in data visualization system that automatically optimizes tick mark alignment to improve readability and conceptual accessibility of multiple graphs presented in a common display area. In a particular embodiment, the data visualization system optimizes the tick mark alignment by normalizing the orders of magnitudes of the data sets and minimizing an objective function that balances tick resolution versus unused chart space on the common axis. The data visualization system may optionally color code the graphs and data ranges represented on the common axis to improve readability.

The automatic procedure for adjusting the scaling and tick mark alignment of the data sets is based on the display dimensions, which allows the graphs to be quickly re-optimized and redrawn on the fly. For example, the graphs may be automatically re-optimized and redrawn in response to display screen rotation, display area resizing, and display on different devices. Similarly, the graphs may be automatically re-optimized and redrawn in response to changes in the content of the data sets. In addition, the reformatted display parameters for different display settings selected by the user (e.g., different display orientations) may be cached for rapid access. In view of the computational speeds and cache features of modern personal computing devices, the automatically data visualization or graph reformatting process may therefore appear to be effectively instantaneous to the typical user.

It will be understood that additional techniques and structures for implementing particular embodiments of the invention and accomplishing the associated advantages will become apparent from the following detailed description of the embodiments and the appended drawings and claims.

DETAILED DESCRIPTION

Figure 1:
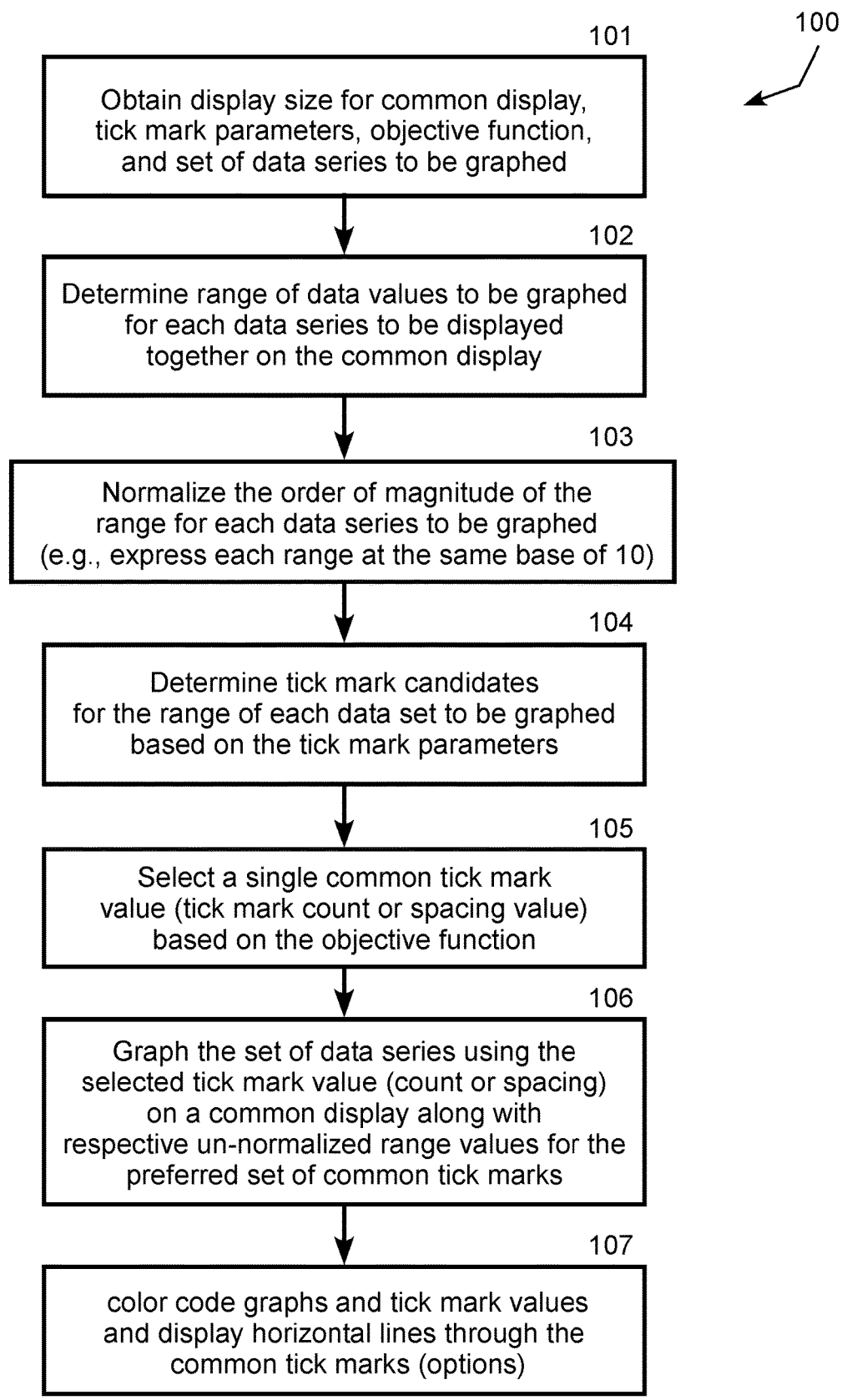
FIG. 1 is logic flow diagram illustrating a method for optimizing tick mark alignment to improve readability and conceptual accessibility of multiple graphs presented in a common display area.

This invention relates to visualization of data in graphical format as performed by computing systems and mobile devices specifically. Although the preferred embodiments are smartphones and tablets with small display screens, the invention is applicable to graphing of multiple data series onto any type of display. Embodiments of the invention may be realized in a method, system or computer readable code to create a data visualization system that automatically optimizes tick mark alignment to improve readability and conceptual accessibility of multiple graphs presented in a common display area. For example, the data visualization system may optimize the tick mark alignment by normalizing the orders of magnitudes of the data sets and minimizing an objective function that balances tick resolution versus unused chart space on the common axis. Although the invention is not limited to any particular screen size or type of device, embodiments of the invention are particularly well suited to automatically generating multi-axis graphs on small displays, such as tablet and smartphone displays. The data visualization system may produce a range of graph types, such as line, bar, and pie charts, and may optionally color code the graphs and data ranges represented on the common axis to improve readability.

Traditionally data visualizations, such as graphs and charts for analytical dashboards, were designed for presentation on relatively large displays used with desktop computers. As computing devices have shifted towards tablets and smartphones with smaller display screens, traditional data visualization approaches for users without access to desktop or laptop computers have failed to effectively present similar information on smaller screens. Embodiments of the present invention address the need to align tick marks for multiple data sets graphed against a common axis and presented in a common display area (sometimes referred to as "multi-axis graphs") on smaller screen devices without imposing the need to scroll across multiple screens on the users.

A particular embodiment includes a method for optimizing the selection of a common number of axis ticks for multiple data sets graphed against a common axis, where the tick marks for all of the data sets are "round" numbers with a small number of place values. Tick marks with a minimum number of place values are determined by minimizing an objective function that takes this criterion into account. The objective function may also minimize another desired criterion, such as minimizing the unused range area along the common axis.

The intended purpose of the embodiments of the invention is to improve the readability of graphical data for multi-axis charts on mobile and variable size screens by automating selection of axis tick values, axis value precision and axis range of values for all of the data sets graphed against the common axis, such as the vertical or Y-axis. Minimizing an objective function minimizes the unused screen space on the charts while, at the same time, aligning the tick marks with easy to understand "round" values with a small number of place values. Displaying intuitive tick mark with a small number of place values improves the conceptual accessibility of the display for human perception. Automatic adjustment of the graphs eliminates the need for manual configuration of the axis display properties on a case-by-case basis.

For descriptive convenience, the illustrative embodiments are shown with multiple data sets plotted against the vertical or Y-axis. It should be understood, however, that the selection of the Y-axis is merely illustrative. Embodiments of the invention may be configured to produce charts with multiple data sets plotted against the horizontal or X-axis, a polar or w-axis, or any other desired axis.

An illustrative embodiment of the invention postulates that in order to provide easy to read charts on a particular screen size it is helpful to use a method which optimizes the following competing display characteristics:

Minimizing Empty Space: minimizing the amount of unused space above and below the graphs representing the data sets (e.g., stretching the graphs vertically to minimize empty space);

Human Friendliness: presenting "human friendly" tick values to make the tick marks conceptually accessible to a human viewer of the chart (e.g., for each data set graphed against the common axis, minimizing the number of place values for each tick mark when expressed with a normalized order of magnitude);

Tick Mark Alignment: presenting multiple data ranges on a common axis with the tick marks aligned (e.g., the ticks are aligned to produce common tick marks for all data sets graphed against the common axis so that a single set of horizontal reference lines corresponding to the common tick marks can be drawn to improve readability of the chart); and Axis Resolution: presenting an appropriate degree of axis resolution (e.g., the density of tick marks (tick mark spacing) should be dependent on the height of the chart screen area and the range of values in the actual measure visualizations, while at the same time avoiding excessive density).

These four objectives (Minimizing Empty Space, Human Friendliness, Tick Mark Alignment and Axis Resolution) are partially competing. The best available options for Tick Mark Alignment and Human Friendliness are determined empirically without compromising the other objectives. Minimizing Empty Space versus Axis Resolution, on the other hand, are competing objectives optimized through minimization of an objective function.

The automatic procedure for adjusting the scaling and tick mark alignment of the data sets is based on the display dimensions, which allows the graphs to be quickly re-optimized and redrawn on the fly. For example, the graphs may be automatically re-optimized and redrawn in response to display screen rotation, display area resizing, and display on different devices. Similarly, the graphs may be automatically re-optimized and redrawn in response to changes in the content of the data sets. In addition, the reformatted display parameters for different display settings selected by the user (e.g., different display orientations) may be cached for rapid access. In view of the computational speeds and cache features of modern personal computing devices, the automatically data visualization or graph reformatting process may therefore appear to be effectively instantaneous to the typical user.

An important criterion not addressed in prior art data visualization systems is to ensure that the tick value as "round" numbers with a minimum number of place values in order to provide intuitive tick marks to improve the conceptual accessibility of the chart. For example, "round" numbers such as 0.5, 10, 55, 75 with a small number of place values are easy to comprehend, while "off-round" numbers such as 17.33 or 0.47 are more difficult to comprehend at a glance. However, the chart designer may not want all of the data ranges to appear as conventionally normalized numbers, for example where each is expressed on a percent scale (e.g., a range from 100% to 0%, or a range from −100% to 0%). To address this concern, embodiments of the present invention first computes "normalized data sets" by adjusting the order of magnitude of each data set (e.g., expressing each range on a scientific notation scale with the most significant value in the ones place), determines desired sales for the data sets by minimizing the objective function applied to the normalized data sets, and then replaces the data ranges one the original order orders of magnitude for display on the chart. automatically calculates the chart parameters by minimizing an objective function that takes the desired criteria and display size onto account. This allows the charts to be formatted on the fly at runtime without user involvement upon changes in the chart size as triggered by device orientation changes or other method of window resize on mobile or desktop devices.

An illustrative embodiment of the invention can be used with any number of charts with unrelated value axes, however, it is typically, applied to charts with 1, 2, 3 or 4 data sets applied to a common axis. For the purpose of this invention the "intuitive" tick marks are defined as multiples of 1, 2, 2.5, 4, 5, 10 which were empirically selected based on observed user reaction to different mark values. In addition, the "intuitive" tick marks have a minimum number of place values when the order of magnitude of data set is "normalized" (e.g., each data set is expressed at the same base of 10 or in scientific notation). In other words, illustrative embodiment of the invention minimizes the number of non-zero place values in the common tick marks for each data range.

The process of selecting the common number of ticks for multiple data sets graphed against a common axis is executed in that steps that can be automatically recalculated on demand in runtime without any input from the user (chart designer) should either data in series or the external measurements such as screen size change.

Step 1: The algorithm for each data set to be graphed against the common axis determines the range and order of magnitude of values in each data set. When there are multiple data sets to be graphed a common axis, these data sets are combined together and treated as one for the purposes of range and tick order of magnitude calculation. Then, the order of magnitude of each data set is normalized (e.g., each data ser is expressed at the same base of 10, such as expressing each data set in scientific notation). The system then applies the objective function, which proceeds to evaluate the set of possible number of ticks that the values of the graph can be represented for each of the empirically determined intuitive tick intervals. This evaluation is performed for tick counts ranging from 3 up to the maximum number of ticks possible for the graph, which is determined by dividing the height of the graph by preset number of pixels per tick (heuristically determined to be 25 pixels in an illustrative embodiment for various screen resolutions).

For example, the objective function may balance competing objectives of minimizing the amount of blank space along the common axis, with minimizing the number of non-zero place values for the aligned tick marks along the common axis.

The dimensions (height or height and width) of the chart are variable parameters that can be easily changed in runtime, for example by rotating the device or connecting to external projector or display. When selecting the tick mark step size for a data set, the fractional value of 2.5 in order of magnitude 1 (fractional numbers, as opposed to whole numbers, expressed in "base 10" scientific notation) is only selected when the date set has at least one fractional number. The resulting numbers of possible tick mark choices are saved in a set for each axis. This produced a multi-dimensional array of tickNumber$_{i,j}$ values:

[tickNumber$_{1,1}$, tickNumber$_{1,2}$, tickNumber$_{1,3}$, . . . tickNumber$_{1,m1}$]

[tickNumber$_{2,1}$, tickNumber$_{2,2}$, tickNumber$_{2,3}$, . . . tickNumber$_{2,m2}$] . . .

[tickNumber$_{k,1}$, tickNumber$_{k,2}$, tickNumber$_{k,3}$, . . . tickNumber$_{k,mk}$]

where the data dimensions (identified by the first index i) represents the number of data ranges to be included in the chart. Index i can be from 1 to k where the k is total number of data ranges to be displayed on that chart (which is greater or equal to the number of data series, as multiple data series may be mapped to a common axis); and the measurements (identified by the second index j) are calculated tickCounts for each data range. Index j can be from 1 to mi, where mi is the number of tickNumber values available for the i-th data range (as each data range is a unique data series with unique properties, the number of possible measurement values represented against each axis may vary).

Step 2: In this step the set of potential tick mark values for each axis from Step 1 is analyzed and all values that are less than the largest value tickNumber$_{i,1}$ for i from 1 to m are removed from further analysis. The rest of the potential tick mark values in all arrays are combined in a single-dimensional array eliminating the duplicates. This array represents the set of all possible potential tick mark values that may be used to display the charts.

[tickNumber$_1$, tickNumber$_2$, . . . tickNumber$_n$], where n—is the number of the elements in the resulting set Step 3: In this step the set from step 2 is analyzed to select one best candidate set of tick mark values that will be used for presentation across all a common axis. This is done by selecting the tick count that has the minimum value of the objective function calculated for each available choice of tick counts from the set in step 2. The formulae below outline may serve as an example objective function found to be effective. It should be understood that other implementations of the objective function may be used to determine (also referred to as optimize) the measurement visualizations in the chart.

$$axisTick(x, i) = \max_{1 \le j \le mi}\left(\begin{cases} tickNumber_{i,j} & \text{if } tickNumber_{i,j} \le x \\ 0 & \text{if } tickNumber_{i,j} > x \end{cases}\right)$$

$$f(tickNumber) = \frac{\left(\sum_{i=1}^{k}\left(\frac{axisTick(tickNumber, i)}{tickNumber}\right)^2 - 1\right)^2}{(1 - (0.015 * tickNumber - 0.5)^2) * \ln(\ln(tickNumber^2 + 13) - 2)}$$

where
  tickNumber is the element being evaluated from the set from step 2 for which objective function is calculated; and
  axisTick(x,i) function, is the function that selects the tickNumber for the i-th axis for the purposes of calculating objective function and later for presentation should this tickNumber choice be selected.

The numerator part of the objective function estimates the aggregated amount of unoccupied space in the chart area for the selected tick number (e.g., number of tick marks or tick mark interval size on the common axis). The denominator of the objective function is an empirically found coefficient which establishes a balance of tick mark resolution (e.g., the number of place values in the normalized tick marks expressed at the same base of 10 or scientific notation) versus unused vertical chart space.

FIG. 1 is an example chart demonstrating the results of an illustrative algorithm for laying out four (4) graphs against a common vertical or Y-axis. Notice that the steps selected for the axes (from left to right) are 2, 2.5, 2, 4 (multiplied by the order of magnitude for each axis). Notice how the unoccupied space is distributed among graphs to achieve human friendly presentation.

Figure 2:
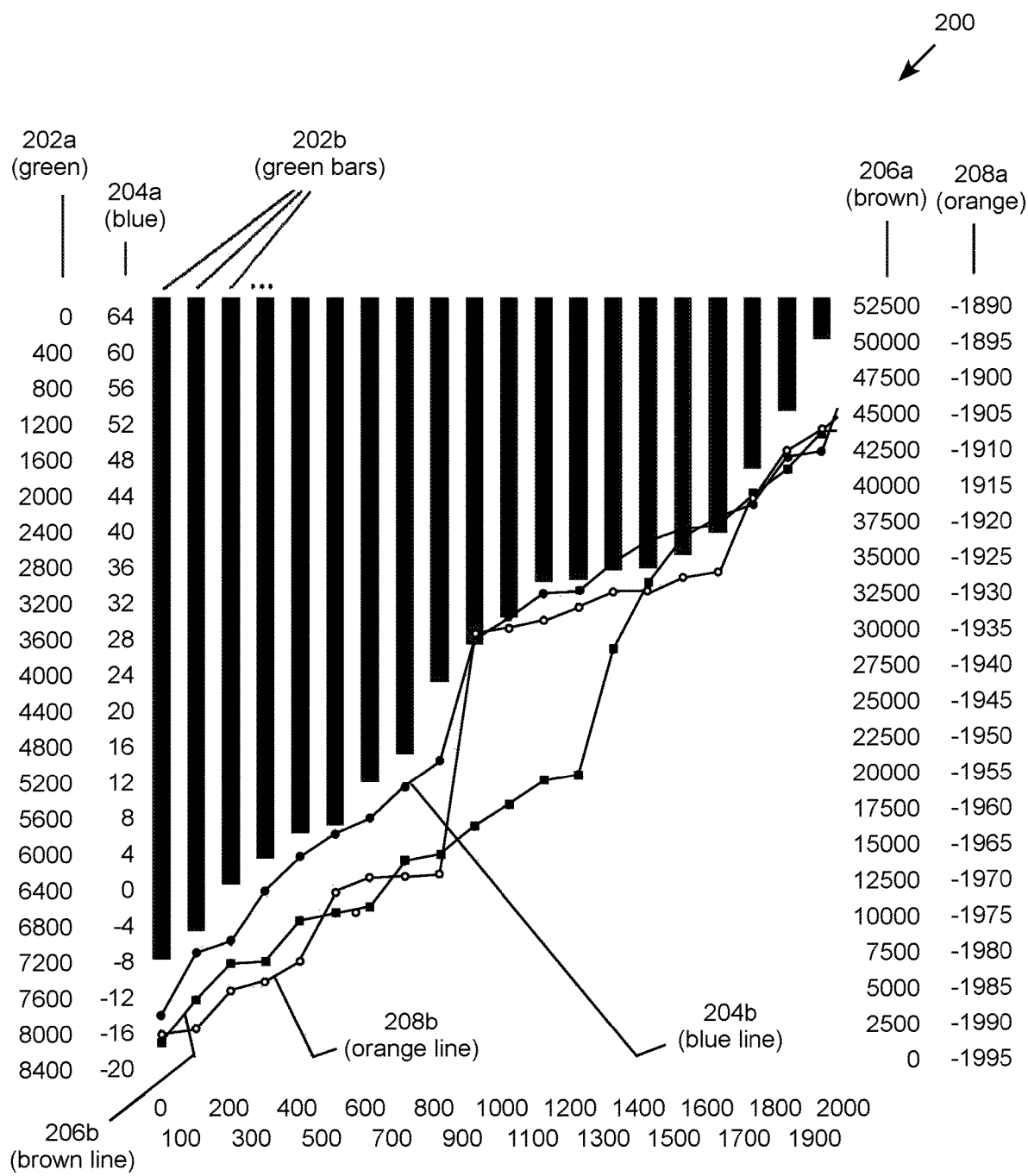
FIG. 2 is a illustrative multi-axis display with tick marks aligned for multiple data sets graphed against a common axis in accordance with the present invention.
Figure 3:
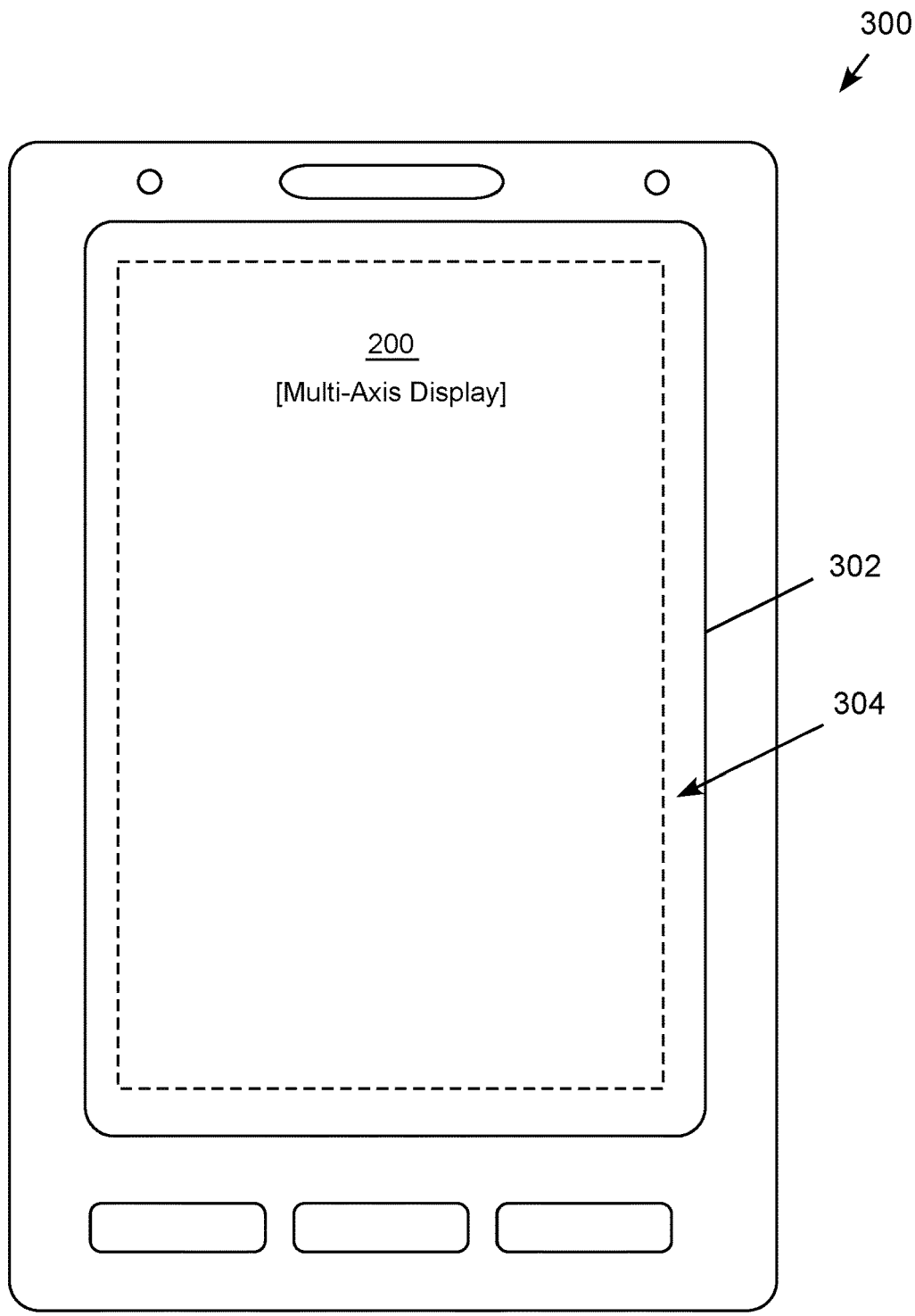
FIG. 3 is a conceptual illustration of multi-axis display sized to fit on the small display screen of a smartphone.

FIG. 1 is logic flow diagram 100 for a method for optimizing tick mark alignment to improve readability and conceptual accessibility of multiple graphs presented in a common display area. FIG. 2 is a illustrative multi-axis display 200 with tick marks aligned for multiple data sets graphed against a common axis in accordance with the present invention, while FIG. 3 is a conceptual illustration of the multi-axis display 304 sized to fit on the small display screen 302 of a smartphone 300.

Referring to the attached logic flow diagram 100, is step 101 the display system obtains the display size (typically expressed in pixels) for a common display, tick mark parameters (typically expressed as the minimum and maximum numbers of pixels between tick marks), an objective function (a representative example is described above), and a set of date series to be graphed (options 1, 2 and 3 graphed above provide a representative example).

In step 102, the display system determines a range of data values to be graphed for each data series to be displayed together on the common display. In the example shown above, the range for option 1 is ~45800 to ~3700; the range for option 2 is ~49 to ~−16; and the range for option s is ~−21 to ~−92.5.

In step 103, the display system normalizes the order of magnitude for the range of each data series to be graphed so that each range is expressed at the same base of 10. In the example shown above, the normalized range for option 1 is ~4.6 to ~3.7, the normalized range for option 2 is ~4.9 to ~−1.6, and the normalized range for option 3 is ~−2.1 to ~−9.3.

In step 104, the display system determines tick mark candidates for the range of each data set to be graphed based on the tick mark parameters. In the example shown above, the tick mark parameters are not less than three pixels between tick marks, and not more than 25 pixels between tick marks. This produces a robust but computationally manageable number of tick mark candidates to be evaluated with the objective function.

In step 105, the display system selects a common tick mark value, such as tick mark count or spacing value, based on the objective function (e.g., the tick count or spacing value that produces the lowest objective function value).

In step 106, the display system graph the set of data series using the selected tick mark value (tick count or spacing) on a common display along with respective un-normalized range values for the selected common tick mark value. More specifically, multiple graphs are plotted in the same display area against multiple vertical axes, where one or more graphs are plotted against a respective vertical axis, where each vertical axis has the same common number of tick marks, the graphs have a horizontally aligned tick marks at a number of vertical tick-mark levels, and the number of vertical levels is determined by the common tick mark value identified through minimization of the objective function.

Step 107 illustrates options to improve readability, in which the graphs are color coded with their respective tick mark values for the display range, and horizontal lines are displayed through the common tick marks. These features are also shown in the chart for the representative example above.

Note in FIG. 2 four data series are graphed against a common Y-axis, with one of the data series displayed as a bar graph and three data series displayed as a line graphs. Each graph corresponds to a different set of range values for the common vertical Y-axis, while all four graphs correspond to the same range values on the horizontal X-axis. While any suitable visual cue may be used, color coding is a handy technique for informing the viewer which graph corresponds to which Y-axis data range. For example, the data range 202a and the bar graph 202b may both be displayed in green to indicate that the data range 202a corresponds to the bar graph 202b. The data range 204a and the line graph 204b may both be displayed in blue to indicate that the data range 204a corresponds to the bar graph 204b. The data range 206a and the line graph 206b may both be displayed in brown to indicate that the data range 206a corresponds to the bar graph 206b. And the data range 208a and the line graph 208b may both be displayed in orange to indicate that the data range 208a corresponds to the bar graph 208b.

It should also be noted that the tick marks are aligned for each interval or level of tick mark. In addition, the tick marks for all of the data sets are "round" numbers that would have a minimal number of place values if expressed in scientific notation, yet the tick marks are expressed at their original order of magnitude. As a result, the order of magnitude is not the same for each data series. In this particular example, the data series 202a is expressed in negative hundreds, data series 204a is expressed in tens, data series 206a is expressed in ten thousands, and data series 208a is expressed in negative thousands for this particular example). In a different example, one or more of the graphs could have different data series graphed against the X-axis instead of, or in addition to, the Y-axis. In another example, the graphs could be expressed as a pie chart or other type of dimension.

It will be appreciated that the invention may be used for a wide range of data types, graph types, and display types. The representative example is provided as an illustrative embodiment without limiting the scope and applicability of the invention. The dimensions of "vertical" and "horizontal" are merely illustrative fort the specific example. Common tick marks could be determined against the horizontal axis or any other dimension, for example radial in a pie chart, as desired.

The present disclosure is particularly well suited to implementation on portable computing devices, which may communicate with a server system providing access to a number of client systems over a network, or as a dedicated computing system. As such, embodiments of the disclosure may comprise adapting or reconfiguring presently existing equipment. Alternatively, original equipment may be provided embodying the disclosure.

All of the methods described in this disclosure may include storing results of one or more steps of the method embodiments in a non-transient storage medium. The results may include any of the results described in this disclosure and may be stored in any manner known in the art. The storage medium may include any storage medium described in this disclosure or any other suitable storage medium known in the art. After the results have been stored, the results can be accessed in the storage medium and used by any of the method or system embodiments described in this disclosure, formatted for display to a user, used by another software module, method, or system, etc. Furthermore, the results may be stored permanently, semi-permanently, temporarily, or for some period of time. For example, the storage medium may be random access memory (RAM), and the results may not necessarily persist indefinitely in the storage medium.

Those having skill in the art will appreciate that there are various vehicles by which processes and/or systems and/or other technologies described in this disclosure can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; alternatively, if flexibility is paramount, the implementer may opt for a mainly software implementation; or, yet again alternatively, the implementer may opt for some combination of hardware, software, and/or firmware. Hence, there are several possible vehicles by which the processes and/or devices and/or other technologies described in this disclosure may be effected, none of which is inherently superior to the other in that any vehicle to be utilized is a choice dependent upon the context in which the vehicle will be deployed and the specific concerns (e.g., speed, flexibility, or predictability) of the implementer, any of which may vary. Those skilled in the art will recognize that various implementations may employ any suitable type of hardware, software, and/or firmware.

Those skilled in the art will recognize that it is common within the art to describe devices and/or processes in the fashion set forth in this disclosure, and then use engineering practices to integrate such described devices and/or processes into data processing systems. That is, at least a portion of the devices and/or processes described can be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity; control motors for moving and/or adjusting components and/or quantities). A typical data processing system may be implemented utilizing any suitable commercially available components, such as those typically found in data computing/communication and/or network computing/communication systems. All of the technology described in this disclosure is suitable for implementation using commercially available computing devices, such as network servers operated by the situational awareness system and smartphones or personal computers operated by members and customers. These computing devices may be interconnected via the Internet, mobile telephone voice and data system, or other data suitable network.

This disclosure sometimes illustrates different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components may be combined to achieve a particular functionality can be seen as "associated with" each other such that the desired functionality is achieved, irrespective of architectures or intermedial components. Likewise, any two components so associated can also be viewed as being "connected", or "coupled", to each other to achieve the desired functionality, and any two components capable of being so associated can also be viewed as being "functionally connected" to each other to achieve the desired functionality. Specific examples of functional connection include but are not limited to physical connections and/or physically interacting components and/or wirelessly communicating and/or wirelessly interacting components and/or logically interacting and/or logically interacting components.

While particular aspects of the present subject matter have been shown and described in detail, it will be apparent to those skilled in the art that, based upon the teachings of this disclosure, changes and modifications may be made without departing from the subject matter described in this disclosure and its broader aspects and, therefore, the appended claims are to encompass within their scope all such changes and modifications as are within the true spirit and scope of the subject matter described in this disclosure. Although particular embodiments of this disclosure have been illustrated, it is apparent that various modifications and embodiments of the disclosure may be made by those skilled in the art without departing from the scope and spirit of the disclosure. Accordingly, the scope of the disclosure should be limited only by the claims appended hereto.

It is believed that the present disclosure and many of its attendant advantages will be understood by the foregoing description, and it will be apparent that various changes may be made in the form, construction and arrangement of the components without departing from the disclosed subject matter or without sacrificing all of its material advantages. The form described is merely explanatory, and it is the intention of the following claims to encompass and include such changes. The disclosure is defined by the following claims, which should be construed to encompass one or more structures or function of one or more of the illustrative embodiments described above, equivalents and obvious variations.

The invention claimed is:

1. A method for displaying multiple data sets, comprising:
receiving a display size of a common display space;
receiving a plurality of data series to be graphed within the common display space, where each data series comprises a plurality of non-normalized numeric values within a data range to be graphed against a common axis;
normalizing the order of magnitude of each data range along the common axis;
determining human friendly tick mark candidates for each data range to be conceptually accessible to a human viewer expressing multiples of 1, 2, 2.5, 4, 5 or 10 having a minimum number of non-zero place values within each data range when the order of magnitude of each data range is normalized along the common axis;
selecting axis resolution for tick marks selected from the tick mark candidates for the display size while minimizing empty space for displaying the data sets against the common axis by minimizing a mathematical objective function balancing these objectives; and displaying multiple graphs in the common display space, wherein each graph depicts one of the data series displayed with its associated non-normalized numeric values plotted against the common axis with selected tick marks aligned with selected tick marks of the other graphs, and with the empty space of the graphs along the common axis and the resolution of the common axis balanced as determined by minimization of the objective function.

2. The method of claim 1, further comprising:

detecting a change in a display size;

repeating the method of claim 1 to re-optimize and redraw the graphs representing the data sets to reflect the changed display size.

3. The method of claim 2, wherein the change in the display size reflects a detected rotation of a display screen defining the display size.

4. The method of claim 1, further comprising color coding each graph with its respective data range.

5. A non-transitory computer storage medium storing instructions executable by a computer to cause the computer to perform a method for displaying multiple data sets, comprising:

receiving a display size of a common display space;

receiving a plurality of data series to be graphed within the common display space, where each data series comprises a data range to be graphed against a common axis;

normalizing the order of magnitude of each data range along the common axis;

determining human friendly tick mark candidates for each data range to be conceptually accessible to a human viewer expressing multiples of 1, 2, 2.5, 4, 5 or 10 having a minimum number of non-zero place values within each data range when the order of magnitude of each data range is normalized along the common axis;

selecting axis resolution for tick marks selected from the tick mark candidates for the display size while minimizing empty space for displaying the data sets against the common axis by minimizing a mathematical objective function balancing these objectives; and displaying multiple graphs in the common display space, wherein each graph depicts one of the data series displayed with its associated non-normalized numeric values plotted against the common axis with selected tick marks aligned with selected tick marks of the other graphs, and with the empty space of the graphs along the common axis and the resolution of the common axis balanced as determined by minimization of the objective function.

6. The computer storage medium of claim 5 further comprising:

detecting a change in a display size;

repeating the method of claim 5 to re-optimize and redraw the graphs representing the data sets to reflect the changed display size.

7. The computer storage medium of claim 6, wherein the change in the display size reflects a detected rotation of a display screen defining the display size.

8. The computer storage medium of claim 5, further comprising color coding each graph with its respective data range.

* * * * *